(12) United States Patent
Pfaff

(10) Patent No.: US 6,839,611 B1
(45) Date of Patent: Jan. 4, 2005

(54) DEVICE AND METHOD FOR DISPENSING A GOOD OR OFFERING A SERVICE AND A SUITABLE SYSTEM HEREFOR

(75) Inventor: Claus Pfaff, Munich (DE)

(73) Assignee: O₂ (Germany) GmbH & Co. OHG, Munich (DE)

( * ) Notice: Subject to any disclaimer, the term of this patent is extended or adjusted under 35 U.S.C. 154(b) by 0 days.

(21) Appl. No.: 10/149,849

(22) PCT Filed: Nov. 24, 2000

(86) PCT No.: PCT/EP00/11739

§ 371 (c)(1),
(2), (4) Date: Oct. 21, 2002

(87) PCT Pub. No.: WO01/45055

PCT Pub. Date: Jun. 21, 2001

(30) Foreign Application Priority Data

Dec. 14, 1999 (DE) .......................... 199 60 254

(51) Int. Cl.⁷ ............................................. G06F 17/00
(52) U.S. Cl. ...................................... 700/237; 700/241
(58) Field of Search ................................. 700/231, 232, 700/237, 241

(56) References Cited

U.S. PATENT DOCUMENTS

| | | | |
|---|---|---|---|
| 4,951,308 A | | 8/1990 | Bishop et al. |
| 5,668,875 A | | 9/1997 | Brown et al. |
| 5,915,226 A | * | 6/1999 | Martineau .................. 455/558 |
| 5,953,323 A | * | 9/1999 | Haartsen ..................... 370/330 |
| 6,038,491 A | * | 3/2000 | McGarry et al. ........... 700/231 |
| 6,325,293 B1 | * | 12/2001 | Moreno ....................... 235/492 |
| 6,356,762 B1 | * | 3/2002 | Guenther ................. 455/456.4 |
| 6,377,589 B1 | * | 4/2002 | Knight et al. .............. 370/524 |
| 6,415,142 B1 | * | 7/2002 | Martineau .................. 455/411 |
| 6,462,644 B1 | * | 10/2002 | Howell et al. ............. 340/5.92 |
| 6,487,540 B1 | * | 11/2002 | Smith et al. ................. 705/21 |
| 6,535,726 B1 | * | 3/2003 | Johnson ..................... 455/406 |

FOREIGN PATENT DOCUMENTS

| | | | | |
|---|---|---|---|---|
| FR | 2812745 A1 | * | 2/2002 | ............ G07F/7/08 |
| FR | 2820853 A1 | * | 8/2002 | .......... G06F/17/60 |
| JP | 09/212730 | | 8/1997 | |
| JP | 10/326376 | | 12/1998 | |
| WO | 99/22346 | | 5/1989 | |
| WO | 99/10844 | | 3/1999 | |
| WO | 99/27465 | | 6/1999 | |
| WO | 00/38443 | | 6/2000 | |

* cited by examiner

*Primary Examiner*—Khoi H. Tran
(74) *Attorney, Agent, or Firm*—Dilworth & Barrese, LLP.

(57) ABSTRACT

An apparatus and a method are provided for the dispensing of a good and/or the release of a service and a suitable system therefor, which allows dispensing the goods and/or releasing the service in a simplified manner by the apparatus having a GSM cell of a network operator.

31 Claims, 1 Drawing Sheet

DEVICE AND METHOD FOR DISPENSING A GOOD OR OFFERING A SERVICE AND A SUITABLE SYSTEM HEREFOR

BACKGROUND OF THE INVENTION

The present invention relates to an apparatus for the dispensing of a good and/or for the release of a service and a suitable system herefor.

Dispensing machines are installed in public areas worldwide in large numbers which, for example, allow customers or users to obtain beverages, candies and similar after inserting coins. In contrast, as a rule the payment of the service in the gastronomic sector takes place in cash, whereas credit cards are also frequently used.

In the sector of dispensing machines, there have already been some trials of cooperation between telecommunications operators or mobile telephony operators and dispensing machine operators in the past. The dispensing of a good here takes place by calling a specific telephone number, preferably clearly recognizable on the dispensing machine, whereby the triggering mechanism for the good is activated. The mobile telephony operator or the network operator here takes care of the billing and the collection risk for the dispensing machine operator. In return for this, the dispensing machine operator profits from a reduced cash float and from the passing on of the collection risk. In addition, the risk of vandalism and the money transport effort is substantially reduced by the reduced use of cash.

In summary, however, the use of the conventional system means that the mobile telephone party or user standing in front of the dispensing machine must dial a specific telephone number which is preferably written on the automat and which may be different with respect to the different goods.

SUMMARY OF THE INVENTION

It is thus the object of the present invention to further develop an apparatus, a method or a system such that the dispensing of the goods or the release of the service is simplified for the user and can nevertheless provide a secured payment system.

In accordance with the application, an apparatus for dispensing a good or for releasing a service is fitted with a GSM cell of a network operator. The advantage is achieved with this measure that the mobile telephone units which are more and more widespread today can be used to obtain a further usability possibility. Since, for example, the apparatus in accordance with the application is provided with a GSM cell of a network operator, the apparatus in accordance with the application is put into a position to recognize a mobile telephone unit and thus to use the data stored in the mobile telephone unit for a payment. The user must thus only bring the mobile telephone unit into the vicinity of the apparatus in order, for example, to come into enjoyment of a good or of a service. In this manner, the user is, for example, saved a complicated conventional dialling procedure and the user does not have to carry out any further actions except for the pressing of the good selection button and the bringing near of a mobile telephone unit.

Further advantageous aspects of the present subject matter are disclosed herein.

If the GSM cell works self-sufficiently, i.e., if it is not necessary to have a constant contact to a radio cell, then it is possible to operate the apparatus independent of the location.

If the GSM cell is switched parallel to the coin slot, then a simple retrofitting of existing apparatuses is possible in this manner.

If the GSM cell is connected via a telemetry GSM terminal to the network operator, then a wireless transmission of the user data required for the payment is made possible in this manner.

If the apparatus has an opening, which preferably has a proximity switch, then it is achieved with this measure that only those users receive a good who deliberately bring their mobile telephone units into a zone provided for this purpose, i.e., for example, an opening in the apparatus and a proximity switch provided for this purpose detects this procedure and thus possibly activates the GSM cell or also the whole dispensing machine from a stand-by state.

If in addition, a reading apparatus is provided, which reads specific parameters, for example the identity of the user and the time of use, then the transmission rate and/or the transmission volume is optimized in this manner.

If the triggering of the goods or the release of the service is only carried out when the handover last provided is not carried out, then the adaptation problems with respect to the apparatus in accordance with the application are minimized since commercial GSM cells can be used to work in accordance with the application.

Further advantageous aspects of the present invention are described herein.

BRIEF DESCRIPTION OF THE DRAWINGS

A preferred aspect of the present invention should be represented with reference to FIG. 1.

DESCRIPTION OF THE PREFERRED EMBODIMENT

Figure 1:
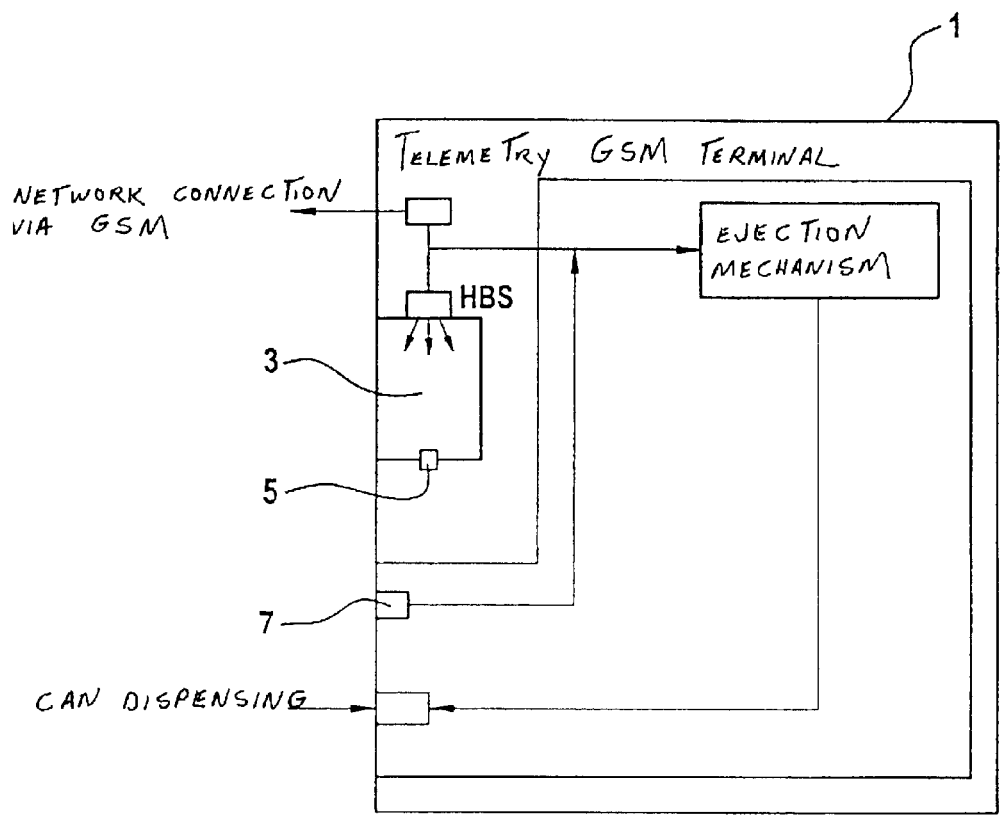

In FIG. 1, the mechanical design of an apparatus 1 for the dispensing of a good, a so-called dispensing machine, is represented. In this preferred embodiment, an opening 3 is provided into which a mobile telephone unit, for example a telephone, can be brought. The bringing in of the telephone is detected by a proximity switch 5 which, for example, emits a signal which activates the GMS cell designed as a so-called home base station "HBS" and/or wakes up the whole dispensing machine from a stand-by state. After, for example, the proximity switch detects the bringing in of the mobile telephone unit, the mobile telephone unit starts to communicate with the HBS, with an exchange of data of the data present in the mobile telephone unit being carried out with the HBS. However, before the so-called handover takes place, which, for example, passes on the mobile telephone unit from one radio cell to the next radio cell unnoticeably for the user in normal operation, the ejection mechanism of the dispensing machine is activated. If the handover were to take place, then the mobile telephone unit would, for example, disconnect from the network since the HBS works self-sufficiently, i.e. does not communicate with a radio cell.

As is furthermore represented in FIG. 1, the activation of the ejection mechanism is, for example, switched in parallel with a coin slot 7 so that conventional apparatuses can be retrofitted in a simple manner, conventional dispensing machines being able to work, on the other hand, conventionally via a coin slot.

For the simplified payment or direct payment, a telemetry GSM terminal is provided which is connected to the network operator via the GSM. In this manner, the data relevant for the bill can be transmitted and be invoiced to the user within the framework of his normal mobile telephone bill or telephone bill.

For the better understanding, the procedure for the dispensing of the good by means of an apparatus described above should be represented in the following, with the procedure described being independent of the location since only a connection of the network operator via GSM is necessary for the operation of the apparatus and thus only power and a GSM coverage must be present. To obtain a good from the dispensing machine, the user, for example, initially presses a button for the good to be selected. Optionally, this can also take place after the insertion of the terminal. Then the user holds the mobile telephone unit in the opening. The proximity switch switches on the HBS, with this functionality, however, being optional. However, it serves both to save power and for better radio engineering relationships outside the automat. The mobile telephone unit detects the new GSM cell and tries to log in, i.e. a handover as between normal radio cells is attempted as usual. Since the GSM cell equipped as an HBS is not, however, connected to the actual GSM network, no handover can take place. The mobile telephone unit continues to remain logged in to the network and incoming transmissions to the mobile telephone unit or calls can take place. During the logging in procedure, the HBS receives information on the identity of the mobile telephone unit and thus on the user. It is, for example, also possible with this identification that the HBS controls whether only mobile telephone units of its own network or foreign mobile telephone units with corresponding SIM modules are accepted.

To transmit this information, the HBS must only be modified such that after it has been addressed by such a mobile telephone unit, this information is transmitted to the telemetry terminal.

If, for example, different prices should be possible for different goods, then a coupling could take place to a keypad provided at the dispensing machine. After transmission of the information, for example via the telemetry terminal, a signal transmission takes place to the automat which enables an ejection of the good.

It has been found to be advantageous for the telemetry terminal to take the information and transmit it to the GSM network as a short message (SMS) since the transmission of the SMS includes error security protocols, i.e. makes available protection against transmission defects and the usual GSM data security. Finally, the information are accepted at the network side by a server which can modify the format of the data such that it corresponds to the format of roaming partners.

Radio engineering deliberations will be taken into account in the following. The HBS, which is fitted to the interior of the dispensing machine and which works per se with very low powers, is shielded to the outside by the insertion opening which is as small as possible. In addition, the arm of the customer or of the user, which covers the opening when the terminal is introduced, provides an additional damping or shielding.

An additional radio engineering damping or shielding can likewise be achieved when a fine-meshed chain curtain covers the insertion opening.

Furthermore, it is achieved by the proximity switch that the HBS is only active when a customer inserts a terminal in order thus to avoid outward radiation without an inserted terminal and an unwanted triggering is avoided which would result in an invoicing. However, the terminal is always ready for operation during this time so that it always remains logged in to the actual GMS radio cell.

It must be noted at this point that in addition to the dispensing of goods, the release of a service is also possible, i.e. in the gastronomic sector, payment can be made in that the restaurateur takes an apparatus in accordance with the application and the user only places a mobile telephone unit onto a mobile apparatus and can thus set the payment of the service in motion.

What is claimed is:

1. An apparatus for the dispensing of a good and/or for the release of a service, comprising a GSM cell of a network operator structured and arranged for recognizing a moblile telephone unit which is located near the apparatus, and means for dispensing the good and/or releasing the service after the apparatus has recognized the mobile telephone unit by said GSM cell.

2. An apparatus in accordance with claim 1, characterized in that the GSM cell works self-sufficiently, avoiding constant contact or communication with a radio cell, whereby the apparatus can be operated independently of location.

3. An apparatus in accordance with claim 1, wherein the GSM cell is switched parallel to a coin slot.

4. An apparatus in accordance with claim 1, wherein the GSM cell is connected to the network operator via a telemetry GSM terminal.

5. An apparatus in accordance with claim 1, wherein an opening (3) is provided in said apparatus (1) to receive the mobile telephone unit.

6. An apparatus in accordance with claim 1, wherein a reading apparatus is provided which reads specific parameters.

7. An apparatus in accordance with claim 1, wherein the GSM cell has a low range.

8. A method of dispensing a good and/or releasing a service, comprising:

a) making available an apparatus which includes a GSM cell and a good for dispensing;

b) making available a mobile telephone unit;

c) bringing the mobile telephone unit near the apparatus; and d) triggering the good and/or releasing the service after the GSM cell has recognized the mobile telephone unit.

9. A method in accordance with claim 8, wherein the recognition of the mobile telephone unit takes place by reading the user identity and the time of use.

10. A method of dispensing a good and/or releasing a service, comprising:

a) making available an apparatus which includes a GSM cell and a good for dispensing;

b) making available a mobile telephone unit;

c) bringing the mobile telephone unit near the apparatus; and d) triggering the good and/or releasing the service after the GSM cell has recognized the mobile telephone unit, wherein the triggering of the good and/or releasing the service takes place by holding the mobile telephone unit into an opening of the apparatus.

11. A method in accordance with claim 8, wherein the triggering of the good and/or release of the service takes place in that handover made available by the network is not carried out.

12. A method in accordance with claim 8, wherein a hand telephone is used as the mobile telephone unit.

13. A system for the dispensing of a good, using the apparatus in accordance with claim 1 and comprising a mobile telephone unit and a GSM cell provided in a goods dispensing unit.

14. An apparatus in accordance with claim 2, wherein the GSM cell is switched parallel to a coin slot.

15. An apparatus in accordance with claim 2, wherein the GSM cell is connected to the network operator via a telemetry GSM terminal.

16. An apparatus in accordance with claim 3, wherein the GSM cell is connected to the network operator via a telemetry GSM terminal.

17. An apparatus in accordance with claim 14, wherein the GSM cell is connected to the network operator via a telemetry GSM terminal.

18. An apparatus in accordance with claim 2, wherein an opening (3) is provided in said apparatus (1) to receive the mobile telephone unit.

19. An apparatus in accordance with claim 14, wherein an opening (3) is provided in said apparatus (1) to receive the mobile telephone unit.

20. An apparatus in accordance with claim 17, wherein an opening (3) is provided in said apparatus (1) to receive the mobile telephone unit.

21. An apparatus in accordance with claim 5, wherein the opening is provided with a proximity switch.

22. An apparatus in accordance with claim 6, wherein the specific parameters include identity of the user and time of use.

23. An apparatus in accordance with claim 18, wherein the opening is provided with a proximity switch.

24. An apparatus in accordance with claim 19, wherein the opening is provided with a proximity switch.

25. An apparatus in accordance with claim 20, wherein the opening is provided with a proximity switch.

26. An apparatus in accordance with claim 1, wherein the mobile telephone unit is located in the GSM cell of a vending machine, such that said apparatus is able to recognize the mobile telephone unit and use data stored therein for telephone payment.

27. An apparatus for the dispensing of a good and/or for the release of a service, comprising a GSM cell of a network operator, and a mobile telephone located in the GSM cell of a vending machine, such that said apparatus is able to recognize the mobile telephone unit and use data stored therein for telephone payment and is structured and arranged such that a user need only bring the mobile telephone unit in a vicinity of said apparatus and simply press a selection button on the mobile telephone unit to obtain a good or service from said vending machine.

28. An apparatus for the dispensing of a good and/or for the release of a service, comprising a GSM cell of a network operator, and wherein said apparatus is a dispensing machine (1), comprising an opening (3) into which a mobile telephone unit can be introduced, a proximity switch (5) arranged to detect the mobile telephone unit and emit a signal activating the GSM cell structured and arranged as a home base station, thus activating the dispensing machine (1), ejection mechanism within the dispensing machine (1) being activated by the GSM cell, a coin slot (7) in the dispensing machine (1) structured and arranged to be activated in parallel by the ejection mechanism, and a telemetry GSM terminal provided within the dispensing machine (1) and connected to the network operator.

29. An apparatus in accordance with claim 1, being structured and arranged such that a user need only bring the mobile telephone unit in a vicinity of said apparatus and simply press a selection button on the mobile telephone unit to obtain a good or service from said apparatus.

30. An apparatus in accordance with claim 29, structured and arranged to operate without the mobile telephone unit directly contacting the apparatus.

31. An apparatus in accordance with claim 1, structured and arranged to operate without the mobile telephone unit directly contacting the apparatus.

\* \* \* \* \*